Patented June 12, 1945

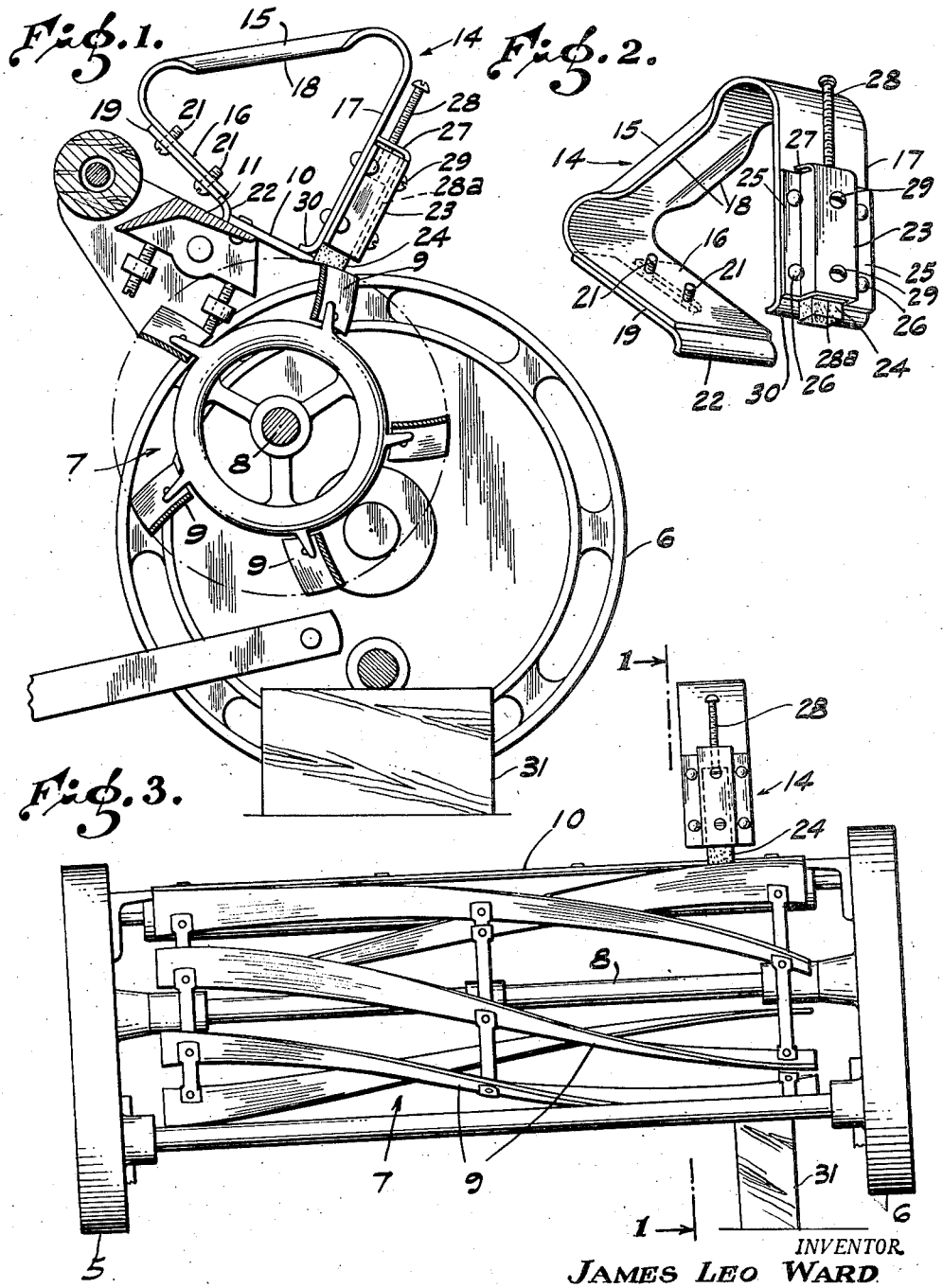

2,377,984

UNITED STATES PATENT OFFICE 2,377,984

LAWN MOWER SHARPENER

James Leo Ward, Inglewood, Calif.

Application October 27, 1944, Serial No. 560,609

7 Claims. (Cl. 51—246)

This invention relates to a lawn mower sharpener.

More specifically speaking the invention pertains to a device to carry a whetstone or like sharpening tool, such tool being thus supported in a position to be accurately guided while being manually reciprocated to sharpen the blades of the mower in a more satisfactory manner.

One object of the invention is to provide a simple, less expensive means to support in a dependable manner the stone or like sharpening tool in the proper position for being manually moved to-and-fro to perform the sharpening operation.

Another object is to provide a device of the above stated kind that can more conveniently be used upon different makes of lawn mowers for the intended purpose.

Still another object is to provide a superior means for supporting the sharpening tool upon the mower in an accurately adjusted position so that the several blades of the mower will be accurately "jointed" thereby causing the mower, after being sharpened, to cut a lawn in a more even manner.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the accompanying drawing which illustrates what is at present deemed to be a preferred embodiment of the invention, Fig. 1 is a transverse section of a lawn mower taken on line 1—1 of Fig. 3, showing the holding device for the sharpening tool supported thereupon.

Fig. 2 is a perspective view showing the sharpening tool and the holding device therefor, separated from the mower, the tool being shown attached to the holder.

Fig. 3 is a side elevation of the structure shown in Fig. 1. In both Figs. 1 and 3 the mower is shown supported in an inclined position by a block under one of its end portions, thus raising the ground wheel at that end of the mower so that the supporting surface will not hinder the operator from rotating the cutters in relation to the sharpener as the sharpening operation proceeds.

Referring in detail to the drawing, the lawn mower shown comprises the ground wheels 5 and 6, rotary cutter blade assembly 7 carried by the shaft 8 which is geared to said ground wheels in the usual manner. The individual, spirally contoured blades 9 of said assembly cooperate with the stationary, straight edged blade 10 secured to the bed plate 11.

The means provided by this invention to adjustably support the sharpening element comprises a rigid, generally stirrup-shaped strap 14 having a midlength or body portion 15 which is continued at one end to form a guide arm 16 and at its opposite end to form a tool holding arm 17. Said body portion 15 of the stirrup-shaped member 14 has along each of its side edges a rounded, inwardly directed flange 18, these flanges affording a better handhold for the operator.

The arm 16 has a guide plate 19 adjustably secured to its outer face in a flatwise manner, said plate 19 being slotted to receive screws 21 which screw into the arm 16 to clamp the plate 19 in its adjusted position. Said plate 19 is attached to the arm 16 in such a manner that the plate has an end portion 22 which is arcuately deflected as shown so as to fit slidably into the track resulting from the juncture of the stationary cutting plate 10 with the bed plate 11. The aforesaid means for adjustably fastening the guide plate 19 to the arm 16 of the member 14 enables the operator properly to position the lip 22 for being guided by the adjacent portion of the stationary cutter blade 10, which blade is apt to vary in width on different makes of mowers.

To the outer face of the opposite arm 17 is secured a holding means 23 for a whetstone 24, this means being shown as an angular plate so bent as to cooperate with the strap end portion 17 to form a housing for the whetstone and having side flanges 25 to receive the attaching means 26. At its inner end the member 23 has an inwardly directed flange 27 with a threaded hole in it with which cooperates a follower screw bolt 28. With said bolt 28 cooperates a clamping and filler plate 28a, and clamping screws 29 which screw into the outer side of the housing formed by the central or midwidth portion of the angular plate 23 to hold the whetstone securely in the position to which it is accurately adjusted by inscrewing the bolt 28.

The terminal portion of the arm 17 of the device has an inwardly directed edge portion or lip 30 which, when the device is in its operative position, slidably abuts against the normally under face of the stationary mower blade 10 adjacent to the cutting edge of said blade, this blade, together with the bedplate 11 to which it is attached, as shown in Fig. 1 having been moved to inverted positions at the upper side of the mower preparatory to applying the sharpener upon them in the manner illustrated.

One end of the mower is shown supported in or slightly raised position by means of a block 31 so as to leave the adjacent ground wheel 6 free to rotate so the operator can turn the rotary cutter assembly 7 in the desired direction and at the selected speed during the sharpening operation.

Before using the device to sharpen the mower the cutter blades 9 should be adjusted as evenly as possible so that they will pass under the cutter 10 with only moderate friction. Then with the sharpener positioned as shown in Fig. 1 the operator will begin the sharpening operation by grasping the strap run 15 in one hand and will thus move the stone 24 back and forth along the stationary mower blade 10 while simultaneously rotating the wheel 6 until the sharpening operation has been completed.

The stirrup shaped member 14 is somewhat resilient and the adjustment thereof for operation upon a given mower should be such that, when said member is in an unstressed condition, and the lip 22 and outer end portion of the whetstone are spaced as shown in Fig. 1, the applied device will accommodate itself to possible irregularities arising in the width of the blade 10.

What is claimed is:

1. A lawn mower sharpener comprising a substantially rigid strap having a body portion to be grasped by a hand of the operator and an arm at each end consisting of a longitudinal extension of said body portion, said arms converging toward each other, a guide member carried by one of said arms to travel back and forth along the groove or track at the juncture of the bed plate of the mower with the stationary cutting blade thereof, the end portion of the opposite arm of said strap being in a supported, guided relation to the edged portion of said stationary blade, and means carried by the latter arm adjustably to support a sharpening tool in a position to sharpen the rotatable blades of the mower when the operator reciprocates said strap in the direction of the length of said stationary blade.

2. The subject matter of claim 1, and said body portion of said strap having an inwardly directed rounded flange along each side edge to afford a handhold for the operator.

3. In a lawn mower sharpener, a generally stirrup-shaped member having a central portion to be grasped by the operator's hand and converging end portions one of which has a terminal portion shaped to travel back-and-forth along the juncture of the bed plate of the mower with its stationary cutting blade, the opposite end portion of said member being in a supported guided relation to one face of said stationary cutting blade adjacent to its cutting edge, and means carried by the latter end portion of said stirrup-shaped member to support a sharpening tool in a position to sharpen the several rotatable blades of the mower when the operator reciprocates the aforesaid member in the direction of the length of said stationary blade.

4. A lawn mower sharpener comprising a substantially rigid strap having a body portion to be grasped by a hand of the operator and an arm at each end consisting of a longitudinal extension of said body portion, said arms converging toward each other, a guide plate abutting against one of said arms in a flatwise manner and secured adjustably to said one arm with one of its edge portions projecting a variable distance from the end of said one arm, said projecting edge portion of said plate being positionable to travel back and forth along the groove or track at the juncture of the bed plate of the mower with the stationary cutting blade thereof, the end portion of the opposite arm of said strap being in a supported, guided relation to the edged portion of said stationary blade, and means carried by the latter arm adjustably to support a sharpening tool in a position to sharpen the rotatable blades of the mower when the operator reciprocates said strap in a direction of the length of said stationary blade.

5. The subject matter of claim 4, and said guide plate having its projecting edge portion deflected in such a manner as to abut in an endwise, approximately right-angular manner against the bed plate of the mower during the operation of the device.

6. A lawn mower sharpener tool comprising a substantially rigid strap having a body portion to be grasped by a hand of the operator and an arm at each end consisting of a longitudinal extension of said body portion, said arms converging toward each other, a guide member carried by one of said arms to travel back and forth along the groove or track at the juncture of the bed plate of the mower with the stationary cutting blade thereof, the end portion of the opposite arm of said strap being deflected inwardly to overlie in a flatwise manner and glide along the stationary cutter blade near its cutting edge during the sharpening operation, a holding means carried by the latter arm at the side thereof opposite to said deflected end portion, a sharpening tool carried by said holding means for adjustment longitudinally in relation to the arm which carries said holding means, a part of said holding means having through it a screwthreaded opening, and a follower screw operating in said opening in an abutting relation to said sharpening tool to feed the latter toward the blades to be sharpened as the sharpening operation proceeds.

7. The subject matter of claim 6, and said holding means comprising an elongated sheet metal housing having side flanges for attachment to the arm which carries it and having an end flange wherethrough said screwthreaded opening extends.

JAMES LEO WARD.